Patented Dec. 29, 1953

2,664,422

UNITED STATES PATENT OFFICE 2,664,422

MANUFACTURE OF WATER-SOLUBLE CELLULOSE ETHERS

John Downing and James Gordon Napier Drewitt, Spondon, near Derby, England, assignors to British Celanese Limited, a corporation of Great Britain No Drawing. Application July 26, 1950, Serial No. 176,075

Claims priority, application Great Britain September 22, 1949

9 Claims. (Cl. 260—231)

This invention relates to the manufacture of water-soluble cellulose ethers.

Water-soluble cellulose ethers find a number of uses in the production of confectionery, especially in substitution for white of egg; thus the white of egg formerly employed in the production of meringues can be wholly replaced by water-soluble cellulose ethers, which have no effect on the taste of the product. Unfortunately, however, most water-soluble cellulose ethers cannot be used successfully in this way, and of the properties which may be supposed to render a particular specimen satisfactory, while some are not difficult to recognise, others are obscure. The result is that it is not possible to predict whether a particular cellulose ether will or will not be satisfactory simply from a knowledge of its easily recognised or determined characteristics, such as the nature of the etherifying group or groups, the degree of substitution (with respect to each kind of etherifying group where more than one is present), the degree of polymerisation or molecular weight, or, among its physical properties, its viscosity and the variation of viscosity with temperature, its solubility and the variation of solubility with temperature, its coagulation temperature in aqueous solution, its effect on the surface-tension of water, or its clarity or colour. For one thing, it is most desirable that the cellulose ether should be capable of forming with water a long-lived foam, but so far it has not proved possible to correlate this practical requirement with more fundamental properties or with the precise composition of the cellulose ether. Moreover, not all cellulose ethers capable of forming a long-lived foam are suitable, and some other properties as yet unrecognised must therefore be involved, thus making the suitability or otherwise of a particular ether still less predictable.

While it is thus not possible to define in terms of composition or even of fundamental properties a class of cellulose ethers which can be relied on to give satisfaction when used to replace the white of egg used in the production of meringues, we have now found that, by conducting the etherification under a limited range of conditions as defined below, it is possible to produce cellulose ethers which can be confidently relied on for this purpose.

According to the invention we etherify cellulose by the simultaneous reaction of methyl chloride and another lower alkyl chloride in the vapour phase at a temperature above 65° C. with alkali cellulose of packing density above 15 lb./cu. ft., the total alkyl chloride fed being 1.75–3 molecular proportions, and preferably 1.75–2.75 molecular proportions, for each molecular proportion of cellulose (reckoned as one anhydroglucose unit), and the molecular ratio of methyl chloride to the other lower alkyl chloride being between 20:1 and 3:1 or between 1:2 and 1:20, the latter range being preferred. The term "lower alkyl chloride" is to be understood as denoting alkyl chlorides containing up to 4 carbon atoms. It is, however, preferred to employ ethyl chloride.

The alkali cellulose preferably has a packing density of 18–30, and especially 18–25 lb./cu. ft. It may, for example, be made by impregnating a sheet of cellulose, e. g. a good quality wood pulp, with caustic soda solution, squeezing it to give a suitable molar ratio of caustic soda to cellulose, and either breaking down the sheet into small pieces in a suitably adjusted Bridge-Banbury mixer, or first breaking it down in a hammer mill or like device, and then milling the product in a Bridge-Banbury or a mixer of the Werner-Pfleiderer type.

The concentration of the impregnating caustic soda solution is preferably between 20% and 40%, and especially between 25% and 35%. The solution may be at room temperature, or at a higher or lower temperature. The molar ratio of alkali to cellulose after squeezing is preferably such that the amount of caustic soda on the cellulose is roughly equivalent to the amount of the lower alkyl chlorides with which the cellulose is to be treated, but it may exceed or be somewhat less than this, down to a minimum of about 1.75:1 moles of alkali to cellulose. It is preferred to allow the caustic soda to act on the cellulose, e. g. by milling the alkali cellulose for a time such that the viscosity at 20° C. of a 2% aqueous solution of the cellulose ether produced is below 100 cp., and preferably between 10 and 100 cp.

In the preferred method of making the cellulose ether, the alkali cellulose of high packing density is introduced into a pressure vessel, which is then evacuated; the vessel may then be filled with nitrogen or other gas substantially free from oxygen and again evacuated so as to remove any small amounts of oxygen remaining, but this is not, as a rule, worth while. The methyl chloride and other lower alkyl chloride are introduced into the evacuated vessel in vapour form in the amounts and relative proportions specified above, and especially in amount about 2.1–2.65 molecular proportions and in a ratio of methyl chloride to the other lower alkyl chloride between 1:2 and 1:12. The contents of the vessel are then heated to a temperature above 65° C. and especially between about 70° and 120° C. It is advantageous that, at least during the earlier stages of the reaction, the pressure of the lower alkyl chlorides in the reaction vessel should be such that the higher boiling of the alkyl chlorides is near to liquefaction but does not quite liquefy at the temperature employed. If desired, or if necessary to prevent liquefaction, the alkyl chlorides may be introduced in two or more stages or they may be introduced continuously over a period; the methyl chloride and the other lower alkyl chloride may be introduced successively, alternately or simultaneously. The temperature may be kept substantially constant throughout the reaction, or it may be altered, preferably raised, during the reaction. For example, the reaction may be carried out for about 1-2 hours at 70°-90° C., followed by about 1-3 hours at 100°-115° C.

We have found that cellulose ethers made in accordance with the procedure described above, while they may, and do, vary to some extent in their compositions and in their physical properties, can be relied on to be satisfactory when employed for the purpose specified. Among those properties which are known to be essential for this purpose, and which the cellulose ethers possess, are the power of forming a long-lived foam with water, and of being heated in 2% aqueous solution to temperatures up to 85° or 95° C. without the solution undergoing any pronounced thickening corresponding to the coagulation of solutions of methyl cellulose which usually occurs at about 45°-55° C. Even if incipient gelling does occur, the gel-structure is so weak that it remains dispersed throughout the liquid, and no serious increase in viscosity results.

For the purposes of the present invention a foam is regarded as being long-lived if a column of the foam loses less than half its height in 3 hours; this may be expressed by saying that the foam has a half-life of more than 3 hours.

The invention is illustrated by the following examples:

*Example 1*

A sheet of good quality sulphite cellulose pulp was passed through a bath of 30%-33% caustic soda at 60° C. and then squeezed between nip rolls to a wet/dry ratio of about 2.8:1 and a molar ratio of caustic soda to cellulose of about 2.75:1. The sheet was then broken down in a hammer mill, and the alkali cellulose milled for about 3 hours in a Werner-Pfleiderer mixer at room temperature, giving a product having a packing density of about 22 lb./cu. ft. The alkali cellulose was then introduced into a horizontal rotatable autoclave, which was evacuated. 2 molecular proportions of ethyl chloride and 0.6 molecular proportion of methyl chloride were fed into the autoclave, which was then heated for 1 hour at 75° C. and 3 hours at 105° C., the autoclave being slowly rotated throughout the reaction. At the end of the 4 hours reaction period, the autoclave was cooled and the product removed and washed free from salts with alcohol. It dissolved in water to form a 2% solution having a viscosity of about 25 cp. at 20° C.

*Example 2*

Sulphite cellulose of good quality in sheet form was steeped for 1 hour in a 27%-28% caustic soda solution at 20° C. and pressed to a wet/dry ratio of about 2.1:1 and a molar ratio of about 2.0:1. The alkali cellulose sheet was broken up in a hammer mill and then milled for 1-2 hours in a Bridge-Banbury mixer. The alkali cellulose crumb so obtained had a packing density of about 22-24 lb./cu. ft. It was charged into a vertically stirred autoclave, which was then evacuated, after which 2.0 molecular proportions of ethyl chloride and 0.2 molecular proportion of methyl chloride were fed in. The reactants were heated for 3 hours at 110° C., after in the autoclave for 3 hours at 110° C., after which the product was separated and washed free from salts. It was readily soluble in water and gave a 2% solution having a viscosity of about 50 cp. at 20° C.

*Example 3*

Alkali cellulose crumb of packing density of about 22-24 lb./cu. ft. was prepared as in Example 2 and was heated in the autoclave with 2.0 molecular proportions of methyl chloride and 0.15 molecular proportion of ethyl chloride for 2 hours at 80° C. The product was washed free from salts. It was readily soluble in water at room temperature, and its 2% aqueous solution had a viscosity of about 20 cp. at 20° C.

*Example 4*

The process of Example 3 was repeated except that the amount of methyl chloride was 1.7 molecular proportions, the amount of ethyl chloride was 0.1 molecular proportion, and the reaction was carried out for 1½ hours at 85° C. followed by 1 hour at 110°. The clarity of a 2% aqueous solution of the product was rather lower than that of the product obtained in accordance with the process of Example 3.

All the cellulose ethers obtained in accordance with these examples were tested in 1-2% aqueous solution for use in substitution for egg white employed in the production of meringues. All gave good results, but those obtained in accordance with Examples 1 and 2 (employing a higher proportion of ethyl chloride than methyl chloride) were definitely better than those obtained in accordance with Examples 3 and 4. In all cases, a 2% aqueous solution showed no sharp increase in viscosity at any point in the temperature range 20° C. to 90° C.

The molar ratio of alkali to cellulose in the alkali cellulose was determined experimentally, and therefore takes account of selective absorption of caustic soda by the cellulose, and extraction of alkali-soluble components of the cellulose (hemi-celluloses) by the caustic soda bath. The packing density of the alkali cellulose was measured by the following method: A 100 cc. measuring cylinder was filled with the alkali cellulose, and was then dropped 20 times through 3 inches onto rubber; the final volume occupied was then noted and the alkali cellulose was weighed.

In each example the ethyl chloride could be replaced by an equimolecular amount of isopropyl chloride without greatly altering the properties of the cellulose ether produced.

Having described our invention, what we desire to secure by Letters Patent is:

1. Process for the production of cellulose ethers, which comprises subjecting alkali cellulose of packing density above 15 lb./cu. ft. to the simultaneous action, at a temperature above 65° C., of the vapours of methyl chloride and another lower alkyl chloride containing at most 5 carbon atoms, the total amount of alkyl chloride being between 1.75 and 3 molecular proportions for each molecular proportion of cellulose (reckoned as one anhydroglucose unit) and the molecular ratio of methyl chloride to the other lower alkyl chloride being between 1:2 and 1:20.

2. Process according to claim 1, wherein the amount of alkali in the alkali cellulose is approximately equivalent to the total amount of lower alkyl chlorides employed.

3. Process according to claim 1 wherein at least during the first part of the reaction the pressure of the lower alkyl chlorides in the reaction vessel is such that the higher boiling of the alkyl chlorides is slightly below its liquefaction pressure at the temperature employed.

4. Process for the production of cellulose ethers which comprises subjecting alkali cellulose of packing density above 15 lb./cu. ft. to the simultaneous action, at a temperature above 65° C., of the vapours of methyl and ethyl chloride, the total amount of alkyl chloride being between 1.75 and 2.75 molecular proportions for each molecular proportion of cellulose (reckoned as one anhydroglucose unit) and the molecular ratio of methyl chloride to ethyl chloride being between 1:2 and 1:20.

5. Process for the production of cellulose ethers which comprises subjecting alkali cellulose of packing density above 15 lb./cu. ft. to the simultaneous action, at a temperature above 65° C., of the vapours of methyl and ethyl chloride, the total amount of alkyl chloride being between 1.75 and 2.75 molecular proportions for each molecular proportion of cellulose (reckoned as one anhydroglucose unit) and the molecular ratio of methyl chloride to ethyl chloride being between 1:2 and 1:12.

6. Process for the production of cellulose ethers which comprises subjecting alkali cellulose of packing density 18-30 lb./cu. ft. to the simultaneous action, at a temperature between 70° and 90° C., of the vapours of methyl chloride and another lower alkyl chloride containing at most 5 carbon atoms, the total amount of alkyl chloride being between 1.75 and 3 molecular proportions for each molecular proportion of cellulose (reckoned as one anhydroglucose unit) and the molecular ratio of methyl chloride to the other lower alkyl chloride between 1:2 and 1:20.

7. Process for the production of cellulose ethers which comprises subjecting alkali cellulose of packing density 18-30 lb./cu. ft. to the simultaneous action, at a temperature between 70° and 90° C., of the vapours of methyl and ethyl chloride, the total amount of alkyl chloride being between 1.75 and 2.75 molecular proportions for each molecular proportion of cellulose (reckoned as one anhydroglucose unit) and the molecular ratio of methyl chloride to ethyl chloride being between 1:2 and 1:12.

8. Process according to claim 5 wherein the amount of alkali in the alkali cellulose is approximately equivalent to the total amount of lower alkyl chlorides employed.

9. Process according to claim 5, wherein at least during the first part of the reaction the pressure of the lower alkyl chlorides in the reaction vessel is such that the higher boiling of the alkyl chlorides is slightly below its liquefaction pressure at the temperature employed.

JOHN DOWNING.
JAMES GORDON NAPIER DREWITT.

References Cited in the file of this patent

UNITED STATES PATENTS

| Number | Name | Date |
|---|---|---|
| 1,867,050 | Balle et al. | July 12, 1932 |
| 2,067,946 | Picton | Jan. 19, 1937 |
| 2,149,309 | Peterson et al. | Mar. 7, 1939 |
| 2,149,310 | Peterson et al. | Mar. 7, 1939 |
| 2,249,754 | Ellsworth | July 22, 1941 |

FOREIGN PATENTS

| Number | Country | Date |
|---|---|---|
| 302,191 | Great Britain | Dec. 10, 1928 |
| 526,330 | Great Britain | Sept. 16, 1940 |